F. C. FURLOW.

LEVELING DEVICE.

APPLICATION FILED JAN. 4, 1921.

Reissued Apr. 25, 1922.

15,342.

2 SHEETS—SHEET 1.

INVENTOR.
Floyd C. Furlow
By his attorney.
L. W. Campbell

F. C. FURLOW.

LEVELING DEVICE.

APPLICATION FILED JAN. 6, 1921

Reissued Apr. 25, 1922.

15,342

2 SHEETS—SHEET 2.

INVENTOR.
Floyd C. Furlow
By his attorney,
L. V. Campbell.

UNITED STATES PATENT OFFICE.

FLOYD CHARLES FURLOW, OF MONTCLAIR, NEW JERSEY, ASSIGNOR TO OTIS ELEVATOR COMPANY, OF JERSEY CITY, NEW JERSEY, A CORPORATION OF NEW JERSEY

LEVELING DEVICE 15,342. Specification of Reissued Letters Patent. Reissued Apr. 25, 1922.

Original No. 1,315,600, dated September 9, 1919, Serial No. 174,186, filed June 12, 1917. Application for reissue filed January 4, 1921. Serial No. 435,025.

*To all whom it may concern:*

Be it known that I, FLOYD C. FURLOW, a citizen of the United States, residing at Montclair, in the county of Essex and State of New Jersey, have invented a new and useful Improvement in Leveling Devices, of which the following is a specification.

My invention relates to elevators, and has for its object the provision of apparatus to level the car platform with a landing, in the event of the car overruning or underrunning the landing, said apparatus involving improved features of construction and arrangement of parts as will hereinafter be more fully set forth.

Figure 1:
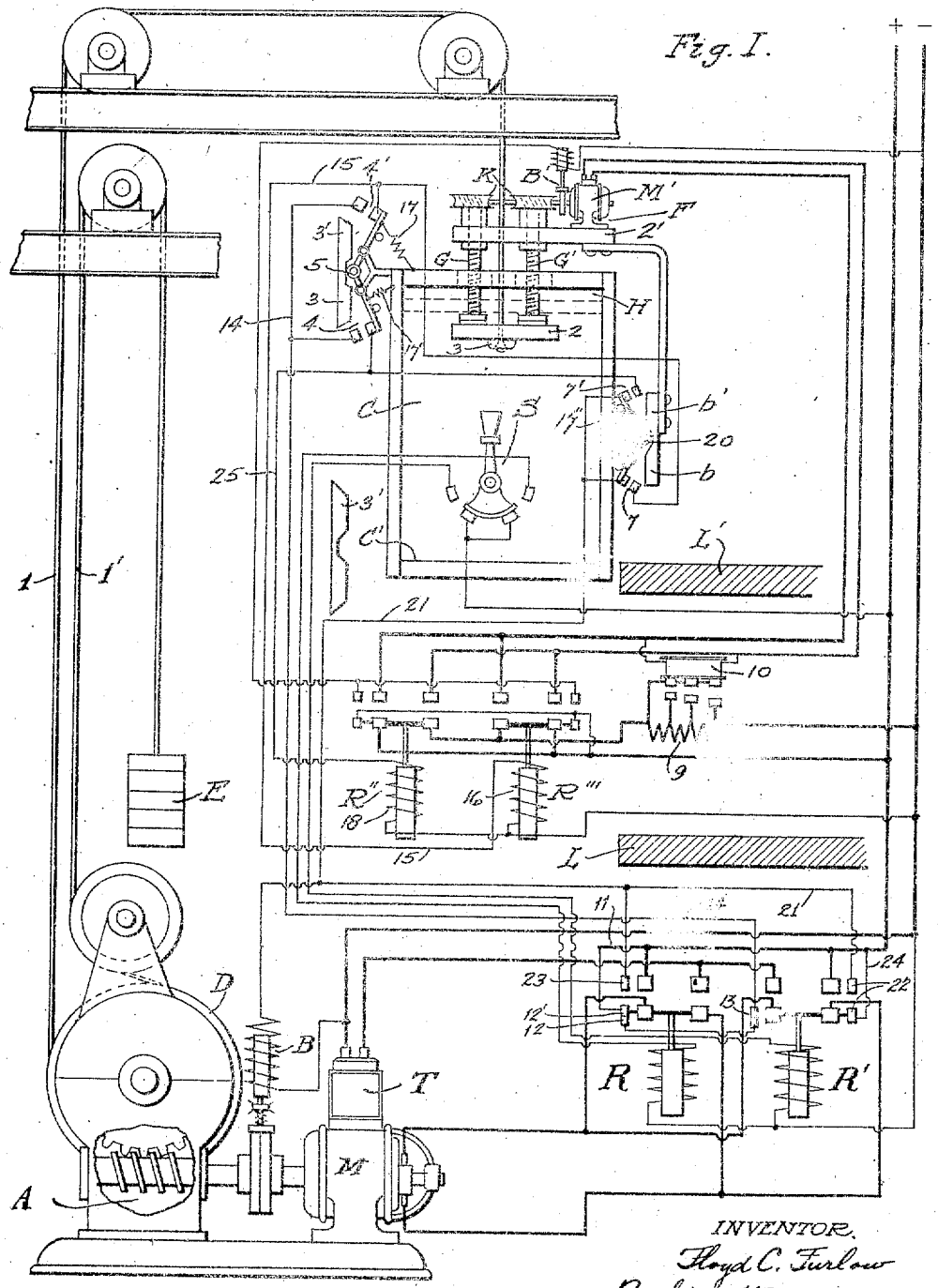
Figure 2:
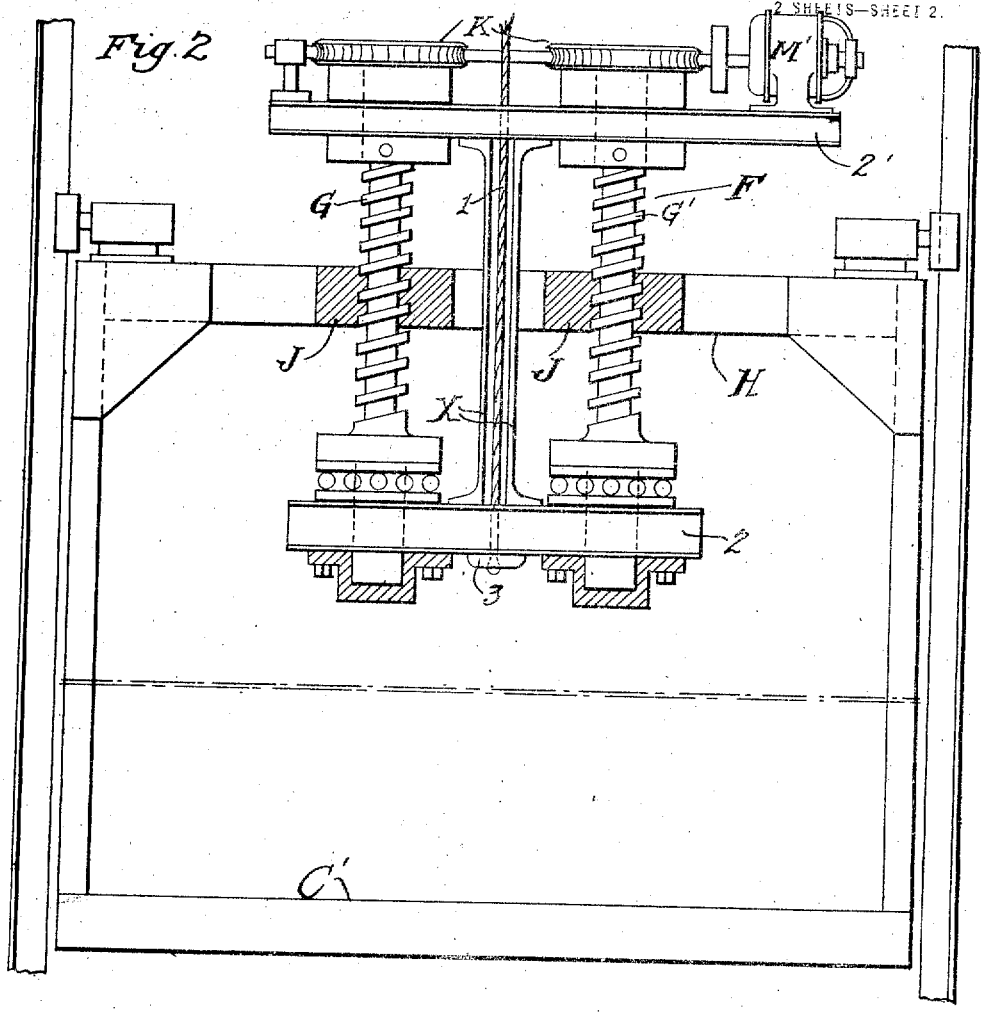
Figure 3:
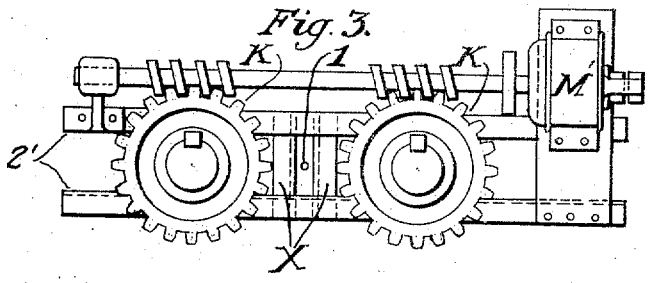

Referring to the accompanying drawings, Figure 1 illustrates in a more or less diagrammatic manner, an electrical elevator system embodying the present invention; Fig. 2 illustrates an enlarged view of the elevator car, together with the mechanism as arranged in accordance with the present invention, to level the car with a landing; and Figure 3 illustrates in plan view, the car leveling mechanism illustrated in Fig. 2.

Referring more particularly to Fig. 1 it comprises an elevator car C, adapted for operation by an electric motor M, through the intermediary of the hoisting apparatus comprising the worm and gear connection A, hoisting drum D, and rope or cable 1. A usual car counterweight E is provided, it being connected to a back-drum rope or cable 1′.

An electro-mechanical brake of a usual type is designated B, a motor rheostat T, and floor landings L, L′.

Electro-magnetic reversing switches R, R′ control the motor M, operating windings for these switches being controlled by a car switch S.

The elements thus far described are well known in the art and have a well known mode of operation.

According to the present invention, supplemental means are provided to raise and lower the car platform C′, such movement of the platform being effected independently of the motor M and the hoisting apparatus already described.

The supplementary means as a whole are designated F and are suspended by the car hoisting cable 1 as illustrated in Fig. 2. The supplemental means comprise a pair of vertically disposed rotatable jackscrews G, G′, seated at their lower end by beams 2, the latter being seated on the rope hitch block 3.

The elevator car is suspended directly by the jackscrews there being secured to the framework H of the car, a pair of blocks J, each having screwthreads engaging the jackscrews.

The jackscrews are adapted for rotation in one direction or the other by means of a supplementary reversible electric motor M′, through the intermediary of any suitable type of reduction gearing such as K for example. The supplementary motor M′, etc., is supported by means 2′, secured to separators X, the latter being secured to the beams 2.

A brake B′ of the electro-mechanical type is provided in conjunction with the supplemental motor M′.

The supplementary motor M′ is controlled automatically to raise and lower and level the car with a desired stopping point or landing in the event of the car under-running or over-running the landing, by means which will be termed herein car leveling cams and coacting switches.

There are two of these cams 3, 3′ at each floor landing, the cams being fixed in the hatchway and offset from each other. The switches 4, 4′ are movable with the elevator car, each having associated therewith a roller 5. The cam 3 coacts with the switch 4, automatically to control the supplementary motor M′, etc., to raise and level the car with a desired landing, and the cam 3′ coacts with the switch 4′ automatically to control the supplementary motor M′ to lower and level the car with a landing.

The blocks J normally assume a position substantially midway between the ends of the jackscrews as illustrated in Fig. 2, the jackscrews effecting movement of the blocks thereon about twelve or fourteen inches in either direction from the normal, and in this manner movement of the car platform in an ascending and descending direction is effected.

An additional set of cams 6, 6′ secured to the beams 2′ and coacting switches 7, 7′ secured to the car, control the supplementary motor M′, etc., automatically to center or return the blocks to normal position in a manner hereinafter described.

Electro-magnetic reversing switches R″, R‴, control the supplementary motor M′, etc., operating windings for these switches being controlled by the car leveling cams and switches.

A sectional starting resistance 9 for the motor M, is controlled by an accelerating magnet 10 having a well known mode of operation.

A description of the various elements through a complete cycle of operation will now be given.

Movement of the car switch handle toward the right hand closes a circuit for the operating winding of the reversing switch R′, the latter operating to close a circuit for the motor M and winding of the brake B. The brake will now release and the motor operate to cause travel of the car in a descending direction. Centering the car switch S, causes the reversing switch R′ to open, thereby opening the motor circuit and effecting application of the brake to stop the car.

When the car approaches to within about twelve or fourteen inches of the landing L, the roller 5, associated with the switch 4′ rides on the cam 3′, and thus closes the switch 4′. The switch 4′ now closes a circuit for the operating winding of the reversing switch R‴ which circuit may be traced as follows:—+ main to wire 11, to feed wire 14, by way of a series of back contacts 12, 13, controlled by the reversing switches R, R′, respectively, switch 4′, wire 15, and thence through winding 16 of the reversing switch R‴ to the — line. The reversing switch R‴ now operates and closes a circuit to the supplementary motor M′, and winding of brake B′. The brake now releases, and the motor M′ through the intermediary of the reduction gears rotates the jackscrews.

In this manner the car platform is moved by the screws in a descending direction until the platform is level with the landing, at which time the roller 5 rides off the cam 3′, and allows the switch 4′ to open by the action of a spring 17. Opening the switch 4′ breaks the circuit for the winding 16′ of the reversing switch, the latter now opening, thereby opening the circuit to the motor M′, and effecting application of the brake B′ to stop the car platform.

It will be noted that the feed wire 14 includes the series of back contacts on the reversing switches R, R′, which results in the motor M′ being put into operation by the cams and switches only when both of the reversing switches are in open position, which of course necessitates the car switch being in a central or normal position.

In the event of the descending car underrunning the landing L, the roller 5 runs onto the cam 3 and effects closing of the switch 4 which closes a circuit for the winding 18 of the reversing switch R″. The brake is released and the motor M′ now operates to effect rotation of the jackscrews in a reverse direction to that heretofore described, and thus the car platform is moved by the screws in an ascending direction, the parts being automatically brought to rest when the car platform is level with the landing, which operation is effected when the roller 5 rides off the cam 3 and allows the switch 4 to open by the action of a spring 17′.

Assume now that the car has been lowered on the jackscrews to a dotted line position as indicated in Fig. 1, which would be the relative position of the parts as effected by the leveling operation for a descending car running short of the landing. The car frame being in this position brings the roller 20 associated with the switch 7′ into engagement with the cam 6, thus the switch 7′ is now closed. A feed wire 21 is controlled by auxiliary contacts 22, controlled by the switch R′, and contact 12′ and 23 associated with the reversing switch R, so that when either reversing switch closes to effect operation of the car by the motor M, a circuit is closed to one or the other of the reversing switches R″, R‴, in the one instance when the switch 7′ is closed by coaction with the cam 6, and the other when the switch 7 is closed by coaction with the cam 6′.

Take now the first instance with the car in dotted line position, and the switch 7′ closed by the cam 6, a circuit may be traced for the winding 18 of the reversing switch R″ as follows:—+ main, wire 24, auxiliary contacts 22 (assuming the reversing switch R′ is closed), feed wire 21, switch 7′, wire 25, and winding 18 to — line. The reversing switch R″ will now close and effect operation of the motor M′ to rotate the jackscrews and raise the car thereon until the latter reaches its normal or centered position on the screws at which time the roller 20 will ride off of the cam 6, allow the switch 7′ to open by the action of a spring 17″, and thus effect stopping of the motor M′.

If the car frame assumes the position on the jackscrews above the normal or centered position, the operation to center the car on the screws is effected by the cam 6′, and switch 7, the latter controlling a circuit for the reversing switch R‴, the latter controlling the motor M′ to lower the car on the jackscrews when either one of the reversing switches R or R″ is closed.

Thus it will be seen that when the car frame assumes a position on the jackscrews either above or below the normal position as indicated in Figs. 1 and 2, the frame is returned to normal position automatically when either one of the reversing switches R or R′ is closed, which is effected of course by operation of the car switch S.

It will be observed that with the arrangement herein provided, if the car platform is caused to move away from its level with the landing, which movement for example may be caused by loading or unloading the platform, the latter will be automatically returned level with the landing, this operation being effected by the cams, and coacting switches, which function to control one of the motors, these elements in effect acting to maintain the car level with the landing.

Without limiting myself to the precise details and arrangement of parts as herein illustrated and described, what I claim as new and desire to secure by Letters Patent of the United States is:—

1. In an elevator system, the combination with the car platform, a motor, supporting means operatively connecting the platform and motor, a supplementary motor to move the car, said supplementary motor being suspended by the supporting means, and means to control the supplementary motor to level the car platform with a landing.

2. In an elevator system, the combination with the car platform, a motor, supporting means operatively connecting the platform and motor, a supplementary motor and connections to move the car, said supplementary motor being suspended by the supporting means, and means automatically to control the supplementary motor to raise or lower the car platform and level the same with a landing.

3. In an elevator system, the combination with the car platform, a motor, a hoisting cable connecting the car platform for operation by the motor, a supplemental motor and a connection operable thereby suspended by the cable to move the car platform, and means automatically to control the supplementary motor to raise or lower the platform and level the same with a landing.

4. In an elevator system, the combination with the car platform, a motor, a hoisting cable connecting the car platform for operation by the motor, a supplementary motor, a threaded shaft suspended by the cable and supporting the platform in a centered position relative to the ends of the shaft, means operating and connecting the supplementary motor and shaft, means to control the supplementary motor, to raise or lower the car platform and level the same with a landing, and additional controlling means to return the car platform to said centered position.

5. In an elevator system, the combination with the hoisting apparatus, a threaded shaft suspended by the hoisting apparatus, a car platform, suspended by the said shaft, a motor operatively connected with said shaft, means to control the motor to raise or lower the car platform and level the same with a landing, and means to control the motor to actuate the shaft to return the platform to a predetermined normal position from which the platform is movable substantially equal distances up or down by rotation of the threaded shaft.

6. In an elevator system, the combination with the hoisting apparatus, a threaded shaft suspended by the hoisting apparatus, a car platform supported by the said shaft, a motor operatively connected to the shaft, means to control the motor to raise or lower the car and level the same with a landing, and means operable automatically to control the motor to return the car platform to a predetermined normal position from which the platform is movable substantially equal distances up or down by rotation of the threaded shaft.

7. In an elevator, the combination with a hoisting cable, a threaded shaft suspended by the cable, a car frame operatively engaging the threaded portion of the shaft for movement up and down thereon by rotation of the shaft, a motive device, and a connection between the motive device and the said shaft.

8. In an elevator system, a car platform, a rotatable screw-threaded shaft, a screw-threaded connection between the car platform and the shaft, whereby upon rotating the shaft the car platform will be caused to be moved upward or downward along the shaft according to the direction of rotation of the shaft, and the car platform be thereby raised or lowered, motive means to rotate the shaft; and means controlled by the car to control the said motive means for rotating the shaft to cause the car platform to be raised or lowered as above stated.

9. In an elevator system, adapted to level the platform of the car with the several landings in the elevator service operation of the car, the car, the main motor hoisting apparatus, hoisting cables between the car and main motor hoisting apparatus, and an auxiliary power apparatus, adapted to level the car with the several landings in the elevator service operation of the car, independently of the main motor hoisting apparatus.

10. In an elevator system, adapted to level the platform of the car with the several landings in the elevator service operation of the car, the car, the main motor hoisting apparatus, hoisting cables between the car and main motor hoisting apparatus, and an auxiliary power hoisting apparatus, adapted to level the car with the several landings in the elevator service operation of the car, independently of the main motor hoisting apparatus.

11. In an elevator system, adapted to level the platform of the car with the several landings in the elevator service operation of the car, the car, the main motor hoisting apparatus, hoisting cables between the car and main motor hoisting apparatus, and an auxiliary power apparatus adapted to level the car with the several landings in the elevator service operation of the car, independently of the main motor hoisting apparatus, and means to control the operation of the main motor hoisting apparatus and the auxiliary power apparatus to operate the car.

12. In an elevator system, adapted to level the platform of the car with the several landings in the elevator service operation of the car, the car, the main motor hoisting apparatus, hoisting cables between the car and main motor hoisting apparatus and an auxiliary power apparatus, adapted to level the car with the several landings in the elevator service operation of the car, independently of the main motor hoisting apparatus, and controlling means common to both the main motor hoisting apparatus and the auxiliary power apparatus to control the service operation of the car to bring the car to a stop level with the several landings.

13. In an elevator system, adapted to level the platform of the car with the several landings in the elevator service operation of the car, the car, the main motor hoisting apparatus, hoisting cables between the car and the main motor hoisting apparatus, and an auxiliary power hoisting apparatus, adapted to level the car with the several landings in the elevator service operation of the car, independently of the main motor hoisting apparatus, and controlling mechanism common to both the main motor hoisting apparatus and the auxiliary power hoisting apparatus to control the service operation of the car and bring it to a stop level with the several landings.

14. In an elevator system, adapted to level the platform of the car with the several landings in the elevator service operation of the car, the car, the main motor hoisting apparatus, hoisting cables between the car and main motor hoisting apparatus, and an auxiliary electric power apparatus, adapted to level the car with the several landings in the elevator service operation of the car, independently of the main motor hoisting apparatus.

15. In an elevator system, adapted to level the platform of the car with the several landings in the elevator service operation of the car, the car, the main motor hoisting apparatus, hoisting cables between the car and main motor hoisting apparatus, and an auxiliary electric motor hoisting apparatus, adapted to level the car with the several landings in the elevator service operation of the car, independently of the main motor hoisting apparatus.

16. In an elevator system, adapted to level the platform of the car with the several landings in the elevator service operation of the car, the car, the main electric motor hoisting apparatus, hoisting cables between the car and main motor hoisting apparatus, and an auxiliary electric motor hoisting apparatus adapted to level the car with the several landings in the elevator service operation of the car, independently of the main motor hoisting apparatus, and an electrically operable controlling mechanism common to both the main electric hoisting apparatus and the auxiliary electric motor hoisting apparatus to control the service operation of the car to bring it to a stop level with the several landings.

17. In an elevator system, the combination with the car platform, a hoisting motor, supporting means operatively connecting the platform and motor, and a supplementary motive means, arranged, adapted and constructed, automatically to move the platform independently of the motion of said motor to a level with the landings.

18. In an elevator system, the combination with the car platform, a hoisting motor, supporting means operatively connecting the platform and motor, and a supplementary motive means, arranged, adapted and constructed to automatically move the platform toward the desired landing from either side thereof, and to come to rest when the platform is level with the landing.

19. In an elevator system, the combination of a car, a hoisting motor therefor, supporting means operatively connecting the car and motor, and a supplementary motive means, arranged and adapted to be in a central position operatively relatively to the car platform, and to be actuable to move the car independently of the motion of the said motor to level the platform with the floor landing, and, when the said motive means have functioned to level the platform with the landing, the motive means to be at that time substantially as they formerly were in their centered position operatively relatively to the car platform.

20. In an elevator system, the combination of a car, of main and auxiliary hoisting motors, and a hoisting cable between the car and motors, the car being operable directly from each of the two motors without the intervention of the other motor.

21. In an elevator system, the combination of a car, main and auxiliary hoisting motors, and a hoisting cable between the car and motors, the car being operable directly from each of the two motors separately and severally without the intermediation of the other motor.

22. In an elevator system, the combination of a car, main and auxiliary hoisting motors, and a hoisting cable between the car and motors, the car being operable directly from each of the two motors separately and severally without the intermediation of the other motor and without movement of the hoisting cables.

23. A hoisting mechanism for elevator cars for initially moving the car to a point near to its landing position, and then completing the trip by imparting a second or final movement to the car, said mechanism including a plurality of hoisting machines, each independently operated by a motor, a counterweight, and cable connections between the same, means for automatically controlling the said hoisting machines so constructed and arranged that when the main or master machine is moving the car to a point near to or approaching its landing, the other or leveling machine is idle, and when the final movement of the car is made, the first or master machine is idle, and the second or leveling machine is operating independent of the master machine, until the car is level with the floor, where it is automatically stopped.

24. A hoisting mechanism for elevator cars for initially moving the car to a point near to its landing position, and then completing the trip by imparting a second or final movement to the car, said mechanism including a plurality of hoisting machines, each independently operated by a motor, means for automatically controlling the said hoisting machines so constructed and arranged that when the main or master machine is moving the car to a point near to or approaching its landing, the other or leveling machine is idle, and when the final movement of the car is made, the first or master machine is idle, and the second or leveling machine is operating independent of the master machine, until the car is level with the floor, where it is automatically stopped.

In testimony whereof I have signed my name to this specification this 22nd day of October, 1920.

FLOYD CHARLES FURLOW.